United States Patent
Zbinden

(10) Patent No.: US 8,320,774 B2
(45) Date of Patent: Nov. 27, 2012

(54) APPARATUS AND METHOD FOR ADJUSTMENT OF INTERFERENCE CONTRAST IN AN INTERFEROMETRIC QUANTUM CRYPTOGRAPHY APPARATUS BY TUNING EMITTER WAVELENGTH

(75) Inventor: Hugo Zbinden, Geneva (CH)

(73) Assignee: ID Quantique SA, Carouge/Geneva (CH)

( * ) Notice: Subject to any disclaimer, the term of this patent is extended or adjusted under 35 U.S.C. 154(b) by 1157 days.

(21) Appl. No.: 11/774,582

(22) Filed: Jul. 7, 2007

(65) Prior Publication Data

US 2009/0010435 A1    Jan. 8, 2009

(51) Int. Cl.
*H04B 10/04*    (2006.01)
(52) U.S. Cl. .................. 398/196; 398/187; 398/195
(58) Field of Classification Search .......... 398/162–164, 398/187, 195–196, 200–201
See application file for complete search history.

(56) References Cited

U.S. PATENT DOCUMENTS

| 6,845,108 | B1 * | 1/2005 | Liu et al. ................. 372/20 |
| 7,035,411 | B2 * | 4/2006 | Azuma et al. ............. 380/256 |
| 7,227,955 | B2 * | 6/2007 | Trifonov et al. .......... 380/256 |
| 7,627,126 | B1 * | 12/2009 | Pikalo et al. ............ 380/279 |
| 2004/0165641 | A1 * | 8/2004 | Garnache et al. .......... 372/97 |
| 2006/0263096 | A1 * | 11/2006 | Dinu et al. ............... 398/187 |
| 2007/0064748 | A1 * | 3/2007 | Mirov et al. ............. 372/20 |
| 2007/0086713 | A1 * | 4/2007 | Ingmar et al. ............ 385/122 |

OTHER PUBLICATIONS

Bennett et al., "Quantum Cryptography: Public key distribution and coin tossing", Int. Conference on Computers, Systems & Signal Processing, 1984, pp. 175-179, Bangalore/India.
Gisin et al., "Quantum Cryptography", Reviews of modern physics, vol. 74, The American Physical Society, 2002, pp. 145-195.
Stucki et al., "Fast and simple one-way quantum key distribution", Applied physics letters 87, 194108, American Institute of Physics, 2005.
Takesue et al., "Differential phase shift quantum key distribution experiment over 105 km fibre", quantph/0507110.
Townsend et al., "Single photon interference in 10 km long optical fibre interferometer", Electronics letters, vol. 29, 1993, pp. 634-635.

* cited by examiner

*Primary Examiner* — Dzung Tran
(74) *Attorney, Agent, or Firm* — Da Vinci Partners LLC

(57) ABSTRACT

An apparatus and method are disclosed for maximizing interference contrast in an interferometric quantum cryptography system to detect eavesdropping by utilizing a tunable emitter station in communications with a receiver station via a quantum communications channel and a "public" communications channel. The tunable emitter station tracks and compensates for interferometer drifts by adjusting the interference contrast of the QC system to minimize or eliminate inherent perturbations induced into key bit transmissions. Tuning of the photo emitter's output wavelength is accomplishable using temperature and/or drive current adjustment of the emitter's tunable optical subsystem.

30 Claims, 5 Drawing Sheets

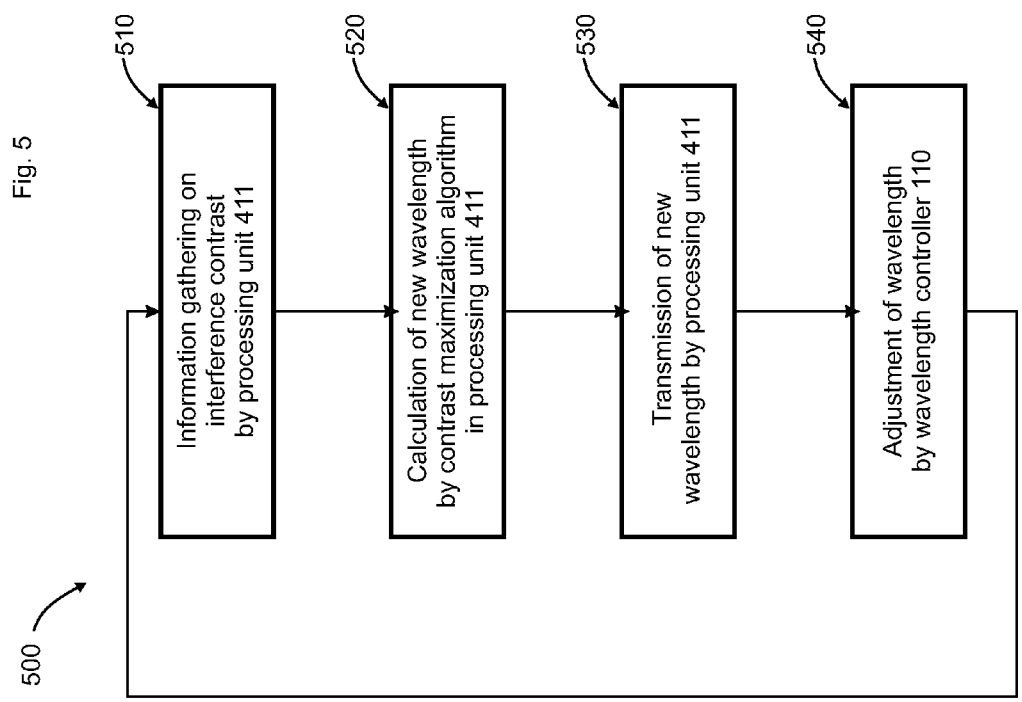

APPARATUS AND METHOD FOR ADJUSTMENT OF INTERFERENCE CONTRAST IN AN INTERFEROMETRIC QUANTUM CRYPTOGRAPHY APPARATUS BY TUNING EMITTER WAVELENGTH

The present application claims the benefit of prior filed U.S. Provisional Application, Ser. No. 60/818,771 filed 7 Jul. 2006, to which the present application is a regular U.S. national application, and which prior application is incorporated herein by reference.

FIELD OF THE INVENTION

The present invention is in the field of quantum cryptography. More specifically, the present invention relates to an apparatus and method allowing adjust the interference contrast in an interferometric quantum cryptography apparatus utilizing emitter wavelength tuning.

BACKGROUND OF THE INVENTION

Two of the goals of cryptography are: (1) making a communication unintelligible to an eavesdropper, and (2) distinguishing legitimate communications from forged or altered ones. If parties duly in communication possess certain shared random secret information (the encryption "key"), they can achieve, with provable security, these two of the goals of cryptography. A one-time pad cryptographic algorithm scheme can achieve the first goal, and a Wegman-Carter authentication scheme can achieve the second goal. Unfortunately both of these cryptographic schemes consume key material and render it unfit for use. It is thus necessary for the parties wishing to protect their communications/messages by using either or both of these cryptographic techniques to devise a way to exchange fresh key material. The first possibility is for one party to generate the key and to inscribe it on a physical medium (disc, cd-rom, rom) before passing it to another party. The problem with this approach is that the security of the key depends on the fact that it has been protected during its entire lifetime, from its generation to its use, until it is finally discarded. In addition, it can be unpractical and tedious to physically distribute the keys.

Because of these difficulties, in many applications one resorts instead to purely mathematical methods which allow parties to agree on a shared secret key over an unsecured communication channel. Unfortunately, all such mathematical methods for key agreement rest upon unproven assumptions, such as the difficulty of factoring large integers. Thus, their security is only conditional and questionable. Future mathematical developments may prove them totally unsecured.

Quantum cryptography (QC) is a method allowing the distribution of a secret key between two distant parties, the emitter and the receiver, with a provable absolute security. QC is new, but known in the field. For example, see *Quantum Cryptography*, N. Gisin, G. Ribordy, W. Tittel and H. Zbinden, *Rev. of Mod. Phys.* 74 (2002). In QC, the parties encode each bit of the key on an elementary quantum system, such as a photon, which they exchange over a quantum channel, such as an optical fiber. The security of this method comes from the well-known fact that the measurement of the quantum state of an unknown quantum system modifies or perturbs the system itself, and said perturbation is detectable. In other words, an eavesdropper on the quantum channel cannot get information on the key without introducing errors in the key exchanged between the quantum emitter and the receiver. The QC key is secure because of the no-cloning theorem of quantum mechanics, which ensures that an eavesdropper cannot duplicate the transmitted quantum system and forward a perfect copy to the receiver.

Several QC protocols currently exist. These protocols describe how bit values are encoded on a quantum systems using sets of quantum states, and how the emitter and the receiver cooperate to produce a secret key. The most commonly used of these protocols, which was also the first one to be invented, is known as the Bennett-Brassard 84 protocol (BB84), disclosed by Charles Bennett and Gilles Brassard in Proceedings IEEE Int. Conf. on Computers, Systems and Signal Processing, Bangalore, India (IEEE, New York, pp. 175-179 (1984)). The emitter encodes each bit on a two-level quantum system either as an eigenstate of:

$\sigma_x(|+x\rangle$ coding for "0" and $|+x\rangle$ coding for "1")

or as an eigenstate of:

$\sigma_y(|+y\rangle$ coding for "0" and $|+y\rangle$ coding for "1").

One says that the bits are encoded in two incompatible bases. For each bit, the emitter uses an appropriate random number generator to generate two random bits of information, which are used to determine the bit value (one random bit) and the basis information (one random bit). The quantum system is sent to the receiver, who analyses it in one of the two bases, i.e., it measures either $\sigma_x$ or $\sigma_y$. The measurement basis is selected randomly for each quantum system. The receiver uses an appropriate random number generator to produce a random bit of information used to determine the measurement basis (the basis information). After the exchange of a large number of quantum systems, the emitter and the receiver perform a procedure called basis reconciliation. The emitter announces to the receiver, over a conventional and public communication channel the basis x or y (eigenstate of $\sigma_x$ or $\sigma_y$) in which each quantum system was prepared. When the receiver has used the same basis as the emitter for its measurement, the receiver knows that the bit value it has measured must be the one which was sent over by the emitter. The receiver indicates publicly for which quantum systems this condition is fulfilled. Measurements for which the wrong basis was used are simply discarded. In the absence of a eavesdropper, the sequence of bits shared is error free. Although a eavesdropper who wants to get some information about the sequence of bits that is being exchanged can choose between several attacks, the laws of quantum physics guarantee that he/she will not be able to do so without introducing a detectable perturbation into the QC key.

In practice, the apparatuses are imperfect and themselves introduce some error in the bit sequence, even when no eavesdropper is present. In order to still allow the production of a secret key, the basis reconciliation part of the protocol is complemented by other steps. This whole procedure is called key distillation. The emitter and the receiver check the perturbation level, also know as quantum bit error rate (QBER), on a sample of the bit sequence in order to assess the secrecy of the transmission. Provided this error rate is not too large, it does not prevent the distillation of a secure key. These errors can indeed be corrected, before the communicating parties apply a so-called privacy amplification algorithm that will reduce the information (in the sense of Shannon's information theory) the eavesdropper (spy) has on the key to an arbitrarily low level.

In recent years, several demonstrations of QC apparatuses have been implemented using photons as the information carrying quantum system and optical fibers as quantum channels. While the original proposal called for the use of single photons as elementary quantum systems to encode the key, their generation is difficult and good single-photon sources do not exist yet. Instead, most implementations have relied on the exchange between the emitter and the receiver of weak coherent states, such as weak laser pulses, as approximations to ideal elementary quantum systems. The level of security achieved by a weak laser pulse QC apparatus can be as high as that of a true single-photon implementation, provided the mean photon number does not exceed a certain value, which depends on the loss budget of the quantum channel.

The first implementations of QC relied on the use of polarization states to encode the bit values to be transmitted. The emitter used a laser source to produce short pulses with linear polarization. It rotated their states one-by-one to produce a random sequence of horizontal, vertical and diagonal polarization states and attenuated them before launching them in the quantum channel. The receiver used a polarizing beamsplitter to measure the polarization state of the incoming pulses. The alignment of the polarizing beamsplitter was set randomly to the horizontal/vertical basis or to the diagonal basis. As the optical fiber used for the quantum channel induces a transformation of the transmitted polarization states, the polarization states have to be realigned by the receiver, before being sent on the polarizing beamsplitter. Incorrect alignment indeed induces errors in the bit sequence. The receiver has to use a polarization controller to perform this task. Experiments demonstrated that this alignment requires continuous tracking, as the polarization transformation induced by the fiber changes over time. There are even times when this transformation varies rapidly and randomly, making tracking impossible.

In order to avoid having to track polarization alignment, Paul Townsend et al. proposed in "*Single-photon interference in a 10 km long optical fiber interferometer*," Electron. Lett. 29, 634-639 (1993), to use the phase difference between two weak laser pulses to encode the bit value. This approach is also known as "phase coding." The emitter uses a laser to produce a short laser pulse, which is sent into an imbalanced interferometer—for example an imbalanced Mach-Zehnder interferometer—to split it into two halves. One arm of the interferometer contains a phase modulator to apply one of four phase shifts corresponding to the four states required in the BB84 protocol. The pulses are then attenuated and launched into the quantum channel. The receiver sends the two half pulses into a matching imbalanced interferometer to superpose them in order to record interference. This second interferometer also contains a phase modulator allowing the receiver to select the basis into which a given pulse will be analyzed by inducing a phase shift on one of the half pulses. The probability that the pulse leaves the interferometer by one of the two outputs depends on the difference of the phase shift applied by the emitter and that of the receiver. If this phase difference is varied, interference fringes are recorded. The path length of one of the interferometer is typically adjusted so that fully destructive interference is recorded in one of the output ports when the emitter and the receiver both apply no phase shifts. When the basis used by the emitter and the receiver are compatible and provided that the interference contrast is good, the interference will be fully constructive in one output port and fully destructive in the other one, guaranteeing that the pulse will go deterministically (with 100% probability) into one of the detectors. This approach belongs to a first class of interferometric quantum cryptography apparatuses, of which there currently exist three.

The advantage of this approach is that both "halves" of the photon travel in the same optical fiber. They experience thus the same optical path in the environmentally sensitive part of the apparatus, i.e., the quantum channel, provided that the variations in the fiber are slower than their temporal separation, determined by the interferometer's imbalance (a few ns at most). In practice, this is the case.

The main difficulty associated with phase coding is that the imbalance of the emitter and the receiver interferometers must be kept stable within a fraction of a wavelength of the photon during a key exchange to maintain correct phase relations. A drift of the path length of one of the interferometers indeed amounts to adding a constant phase shift. This changes the possible values of the phase difference between the two half pulses, which means the interference contrast will not be maximum anymore. The photons will experience a non-zero probability to go out of the wrong output port of the interferometer. These events introduce errors in the bit sequence.

The main source of such path length drifts is thermal expansion of the interferometer, caused by temperature variations. Methods relying on temperature stabilization of the interferometers have been used to maintain as high an interference contrast as possible. They are unfortunately difficult to put in practice. A small change in the temperature of one of the interferometers has indeed a large impact on the phase difference. It is thus necessary to stabilize the temperature with a high accuracy, which is difficult because of the large heat capacity of the interferometers.

A second class of interferometric quantum cryptography apparatuses was introduced in H. Takesue et al. (Differential phase shift quantum key distribution experiment over 105 km fibre, quant-ph/0507110) the content of which is incorporated herein by reference. The authors presented an approach, known as "differential phase coding" (DPS) QC, where the bit values are coded on the phase difference between two adjacent pulses of an infinite train. The emitter uses an amplitude modulator to carve out of a continuous wave (CW) laser beam a train of pulses. A phase modulator is used to induce phase shifts, corresponding to the bit values, on the pulses. The receiver uses an imbalanced interferometer, with a path difference corresponding to the distance between two pulses, to superpose adjacent pulses and record interference. In order to obtain stable low error rate transmission, the wavelength of the CW laser is stabilized and the temperature of the interferometer is adjusted to assure high contrast. Just like in the previous case, such an adjustment is difficult because of the strong dependency between the phase difference induced by the interferometer and its temperature, coupled with its large heat capacity which make it difficult to adjust the temperature accurately.

A third class of interferometric quantum cryptography apparatuses was introduced in Stucki et al. (*Fast and simple one-way quantum key distribution*, App. Phys. Lett. 87, 194108 (2005)), the content of which is incorporated herein by reference. The authors presented an approach, known as "Coherent One-way" (COW) QC, where the bit values are coded on the time of arrival of a pulse out of an infinite train and inter-pulse interference is used for eavesdropping detection. The emitter uses an amplitude modulator to carve out of a continuous wave (CW) laser beam a train of pulse. A bit is coded on a pair of pulses, by removing either the first one or the second one. The receiver sends most of the pulses to a single-photon detector. The time of detection of the pulse reveals the bit value. In order to prevent certain attacks, the receiver will also verify in some cases that a coherent phase relationship exists between adjacent pulses. In order to do so, he/she directs some of the pulses to an imbalanced interferometer, with a path length difference corresponding to the distance between two pulses, to record interference. Just as in the previous case, interference contrast can be maximized by adjusting the temperature of the interferometer while keeping the wavelength of the CW beam stable. In this case, one encounters the same difficulties as those described above.

SUMMARY OF THE INVENTION

The present invention is an apparatus for adjusting the interference contrast in an interferometric quantum cryptography apparatus, and methods for accomplishing this. The present invention relies on tuning of the wavelength of the light source in order to track and compensate for interferometer drifts. This contrasts with the prior art, where the wavelength of the laser is stabilized and the path difference of the interferometer(s) is continuously adjusted, for example by temperature tuning.

An insulated interferometer requiring no or only rudimentary temperature stabilization is used. In cases where a distributed feedback (DFB) laser diode is used as the light source, its wavelength can be adjusted to optimise interference contrast by tuning its operation temperature. This approach is easier than controlling the temperature of the interferometer as the laser is normally mounted on a temperature controller, such as a thermo-electric cooler, and has a much smaller heat capacity. The sensitivity is of the order of 0.1 nm/K. For an interferometer introducing a time delay of 1.2 ns, scanning through a fringe requires to change the wavelength by 7.6 pm. In this case, good contrast interference can be achieved by wavelength control to approximately 1 pm, or equivalently the temperature control of the laser to 10 mK.

With a DFB laser diode, the wavelength can alternatively also be adjusted by controlling the drive current. The sensitivity of such adjustment if of the order of 10 pm/mA and is, for all practical purposes, instantaneous. For a 1.2 ns interferometer, one fringe corresponds to approximately 0.76 mA. In order to obtain good interference contrast, one needs to control the laser current to 0.076 mA. As the absolute value of the drive current is in the order of 100 mA, the impact of the current variations used to tune the wavelength on the output optical power can be neglected. If the DFB laser diode is replaced by a mode-locked laser, one can achieve the same effect by tuning the length of the cavity, for example by using a piezoelectric actuator.

[Insert a line feed: this paragraph describes the difference of the invention with prior art] This contrasts with prior art, where the wavelength of the light source is stabilized, for example in the case of a DFB laser diode by controlling its temperature and the drive current, while actively tracking path length difference changes in the interferometer by temperature tuning or constant phase shift application.

The primary object of the invention is to allow simple and fast interference contrast adjustment by tuning the wavelength of the light source in an interferometric quantum cryptography apparatus. Wavelength can indeed be adjusted with a fast response time and without requiring modifications of the light source. A benefit of the present invention is that it can be practiced utilizing an interferometer which requires no or only rudimentary temperature control. This can reduce the cost of the quantum cryptography apparatus. Moreover, one can avoid inserting a phase modulator into one of the arms of the interferometer, in the cases where this modulator is used for path length drift compensation.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

FIG. 5 is a flow chart illustrating a high-level process flow of the interference contrast optimization method relying on wavelength tuning.

DETAILED DESCRIPTION OF THE INVENTION

A detailed descriptions of the preferred embodiment of the present invention are provided herein. It is to be understood, however, that the present invention may be embodied in various additional forms. Therefore, specific details disclosed herein are not to be interpreted as limiting, but rather as a basis for the claims and as a representative basis for teaching one of ordinary skill in the art to practice the present invention in any appropriate related system, structure or manner.

Figure 1:
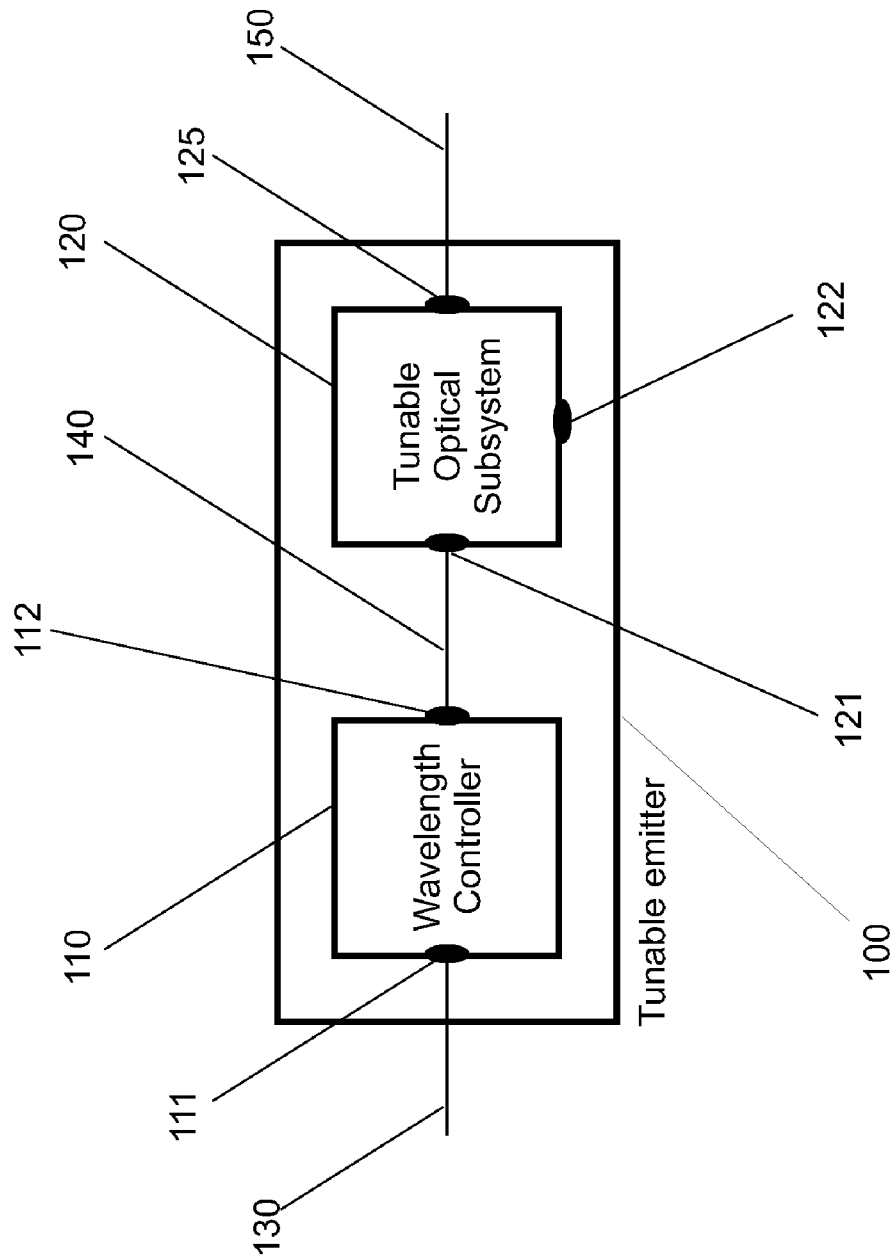
FIG. 1 illustrates a general exemplary embodiment of a tunable emitter of the present contrast adjustable QC system, wherein the tunable emitter comprises a wavelength controller and a tunable optical subsystem.

Referring first to FIG. 1, In a preferred embodiment the invention comprises a tunable emitter 100 including a wavelength controller 110 and a tunable optical subsystem 120. The wavelength controller 110 has process implementation means such as a microprocessor running a program or an appropriate electronic circuit.

The wavelength controller 110 has a controller input 111, in communication with an incoming transmission line 130. The wavelength controller 110 is connected via a signal output 112 to the signal input 121 of the tunable optical subsystem 120 by an internal communications link 140. The transmission line 130 and the internal communications link 140 can be made up of wires or cables carrying electronic signals, or potentially any other appropriate communications means known to and practicable by the ordinary skilled artisan in the present invention. The tunable optical subsystem 120 can also comprise another signal input/output port 122 that can be used to interface it with other components (not shown) of the QC emitter 100. The signal received on the controller input 111 is used by the wavelength controller 110 to derive the signal sent on the internal communications link 140 to the tunable optical subsystem 120 to control the wavelength of the light produced by the optical subsystem 120. The light produced by the tunable optical subsystem 120 is emitted into an optical path 150 through an optical output port 125. The optical path 150 comprises, for example, optical fibers or a free space optical path.

Figure 2:
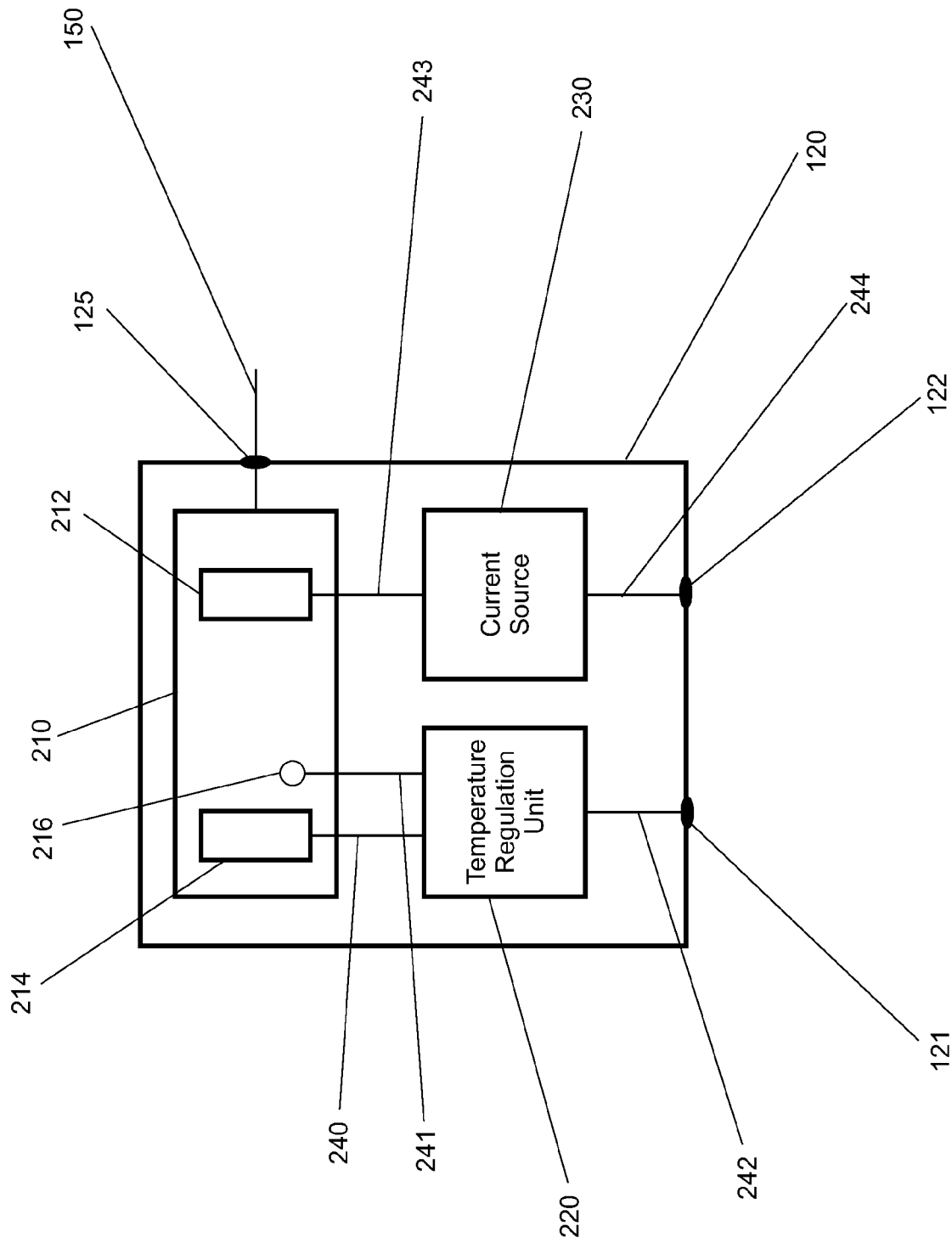
FIG. 2 illustrates a general exemplary embodiment of a tunable optical subsystem practicable in the present contrast adjustable QC system.

Referring now to FIG. 2, a preferred embodiment of the tunable optical subsystem 120 comprises a light source 210, a temperature regulation unit 220, a current source 230 and a temperature controller 214. In the embodiment illustrated, the light source 210 was a laser diode 212. The optical subsystem preferably includes a temperature sensor 216. In the embodiment illustrated, the laser diode 212 is a distributed feedback (DFB) laser diode. The light emitted by the laser diode 212 is emitted into the optical path 150 via the optical output port 125. In the embodiment illustrated, the temperature controller 214 is a thermo-electric cooler, while the temperature sensor 216 is a thermistor. Other means for accomplishing the temperature controller 214 and the temperature sensor are known to and selectable by one of ordinary skill in the art for practice in the present invention. The temperature controller 214 and if appropriate, also the temperature sensor 216 communicate with the temperature regulation unit 220 via signal lines 240 and 241, which can made up of wires and/or cables carrying electronic signals. The temperature regulation unit 220 preferably utilizes a microprocessor 411 (see FIG. 4) running a program or other appropriate electronic circuit. The temperature regulation unit 220 is in communication with the wavelength controller 110 via internal communications link 140 through a signal link 242 and the signal input port 121.

The current source 230 is connected by a signal link line 243 to the laser diode 212. The current source 230 drives the laser diode 212. The current source 230 can also be connected to other components of the QC emitter, for example for current monitoring or setting components, through the signal input/output port 122 via a signal link line 244. Communication link lines, signaling lines and transmission lines (242, 243, 244, etc.) are made up of wires or cables carrying electronic signals.

The temperature regulation unit 220 uses the signal received from the wavelength controller 110 to act on the temperature controller 214 in order to vary the temperature of the laser diode 212 and adjust the wavelength of the light the light source 210 emits. For a DFB laser diode, a change in temperature of 1 degree K will induce a shift of the wavelength on the order of 0.1 nm. One interference fringe in an interferometer with a time delay of 1.2 ns corresponds to a wavelength shift of 7.6 pm, which implies that tuning to approximately 1 pm (about 1/10 of an interference fringe), corresponding to a temperature step of 0.01 degree K, is required for good interference contrast optimization.

Figure 3:
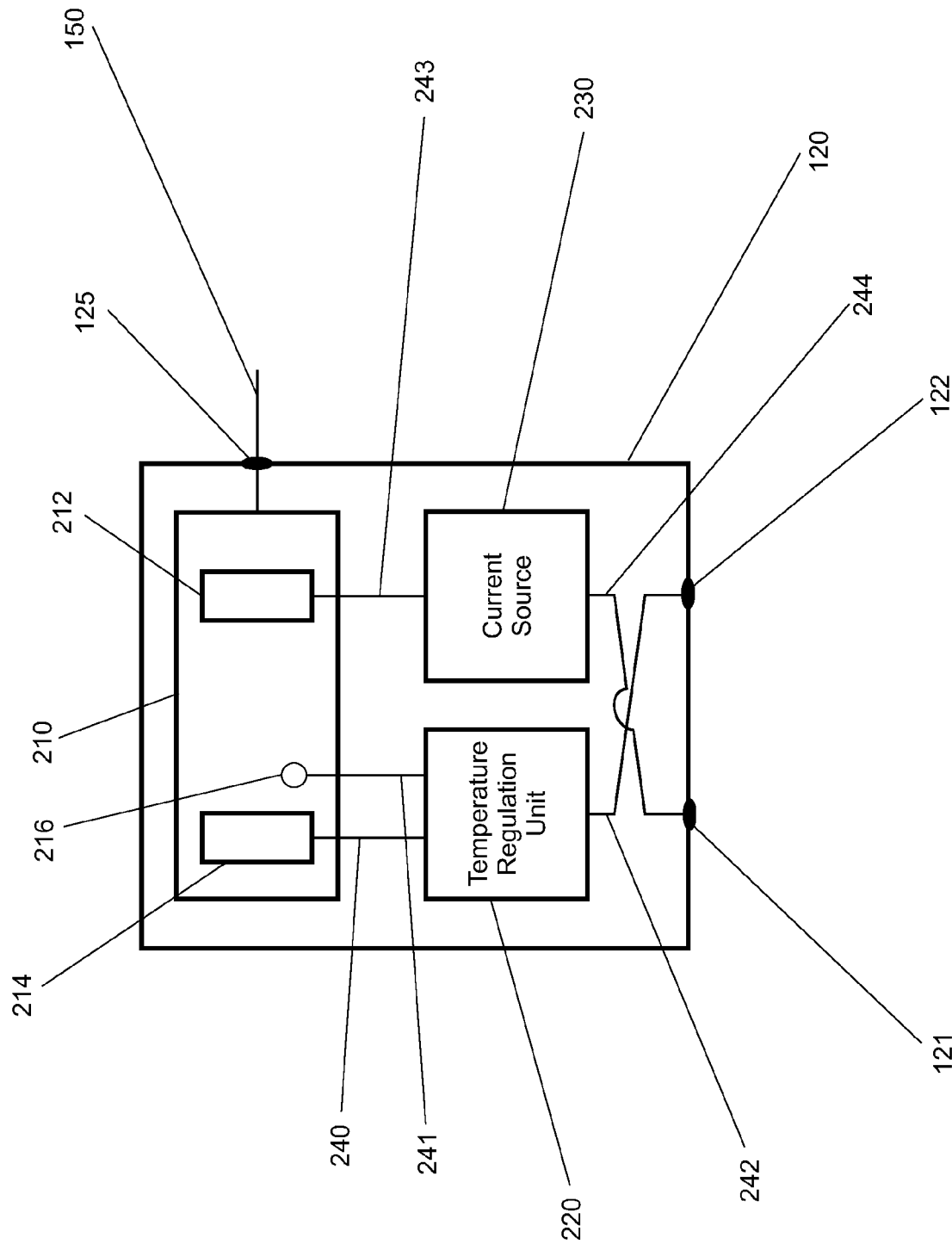
FIG. 3 illustrates a general exemplary embodiment of an alternative tunable optical subsystem practicable in the present contrast adjustable QC system.

In an alternative embodiment illustrated in FIG. 3, the current source 230 is connected by a signal transmission line 244 to the signal input port 121. This allows the wavelength controller 110 to communicate with the current source 230. In this case, the current source 230 is adjustable and uses the signal received from the wavelength controller 110 to adjust the driving current injected into the laser diode 212 and thus adjust/tune the wavelength of the light the diode 212 emits. For a DFB laser diode, a change in current of 1 mA will induce a shift of the wavelength on the order of 10 pm. One interference fringe in an interferometer with a time delay of 1.2 ns corresponds to a wavelength shift of 7.6 pm, which implies that tuning to approximately 1 pm, corresponding to a current step of approximately 0.1 mA, is required for good interference contrast optimization. In this embodiment, the temperature regulation unit can also be connected to other parts of the QC emitter, for example for temperature monitoring or setting purposes, through the signal input/output port 122 by the signal transmission line 242.

Alternatively, the tunable optical subsystem 120 can comprise other types of optical sources having the feature of output wavelength adjustability/tunability, for example, a tunable laser used in a WDM system.

In another alternative embodiment, the tunable optical source 120 comprises a mode-locked laser light source 210. In this case, the spectrum of the light produced by the light source is broad. Consequently, interference contrast is not be adjusted by wavelength tuning, but by tuning of the relative phase difference between subsequent pulses. This phase difference can be controlled by adjusting the cavity length of the mode-locked laser, for example, by using a piezoelectric element allowing to control the position of at least one of the optical elements of the cavity.

Figure 4:
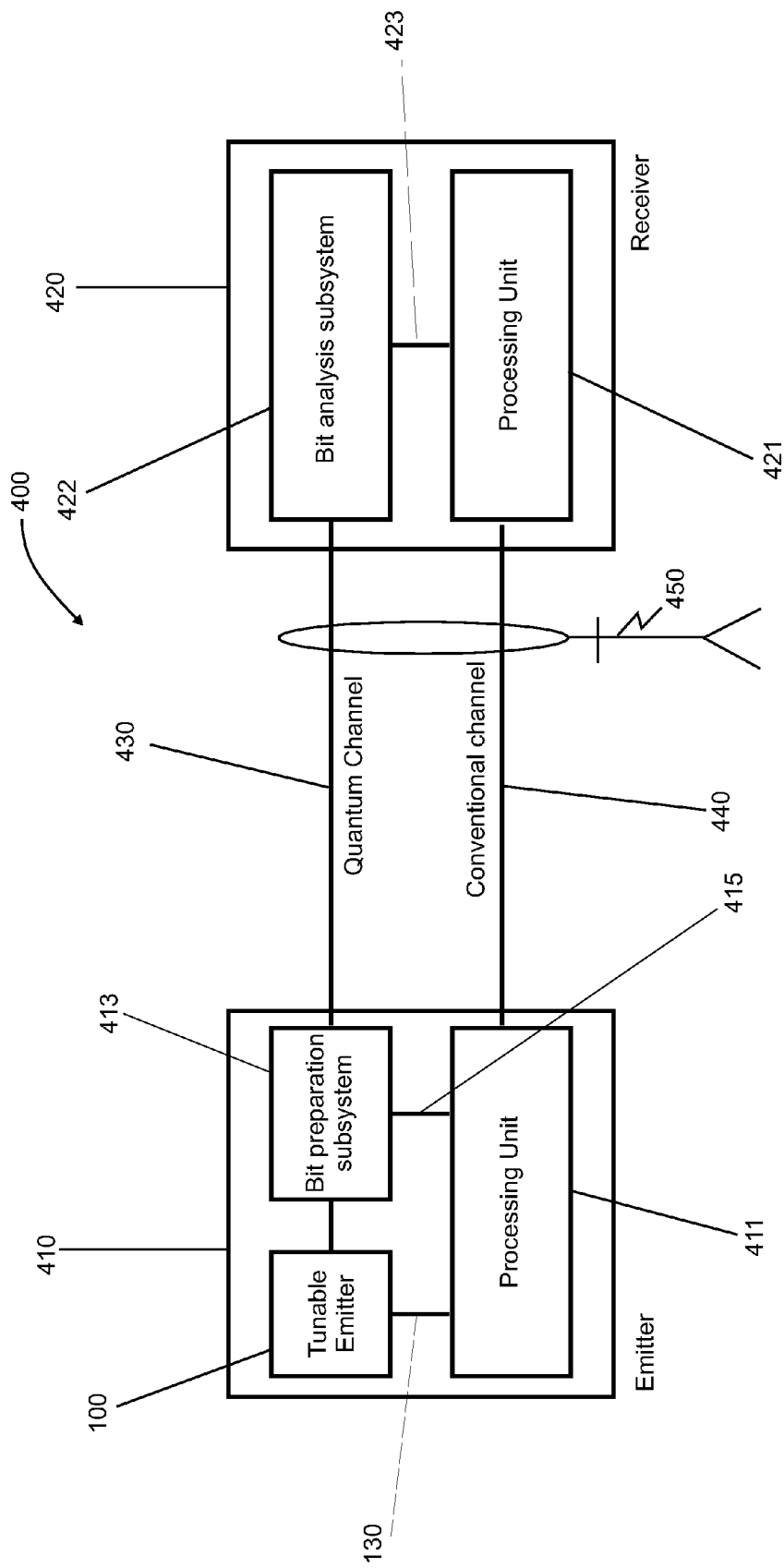
FIG. 4 is a graphic overview a quantum cryptography apparatus of the present invention illustrating both the emitter and the receiver components with quantum and conventional communication links/channels between them.

Referring now to FIG. 4, it is disclosed how the present contrast adjustable interferometric QC Apparatus is accomplished. A tunable emitter 100 is disposed in the emitter station 410 of a quantum cryptography apparatus 400. The QC apparatus 400 also comprises a receiver station 420 in communication with the emitter station 410 via a quantum channel 430 and a conventional channel 440. Examples of communications channels adaptable for practice as the present quantum channel 430 includes: a dedicated optical fiber and a channel in a wavelength division multiplexing optical communication system. Examples of communications channels adaptable for practice as the present conventional communication channel 440 includes: a global computer network, a LAN or WAN, and a second optical fiber carrying bright optical pulses. The QC apparatus 400 is such that an eavesdropper 450 having access to the quantum channel 430 cannot obtain full knowledge of the bit sequence transmitted by the emitter station 410 without introducing errors or perturbations into the transmitted bit sequence with a non-zero probability.

The emitter station 410 also comprises a processing unit 411 and a bit preparation subsystem 413. In the embodiment illustrated, the processing unit 411 was a computer system having a memory, input/output ports, a central processor managing inputs, memory and operating on such to produce desired outputs, and included data transmission and communications mechanisms permitting communications with other components of the emitter station 410. The processing unit 411 is in communication with the public channel 440, which allows it to communicate with the receiver station 420.

The bit preparation subsystem 413, in the case of a QC apparatus 400 using differential phase shift bit encoding, can comprise an amplitude modulator (not shown) carving pulses out of a continuous wave optical beam, a phase modulator (not shown) used to encode bit values by modulating pulse phase and variable optical attenuator (not shown) used to attenuate the beam to set the mean photon number per pulse to an appropriate level. In the case of a QC apparatus 400 using inter-pulse interference for eavesdropper detection, the bit preparation subsystem 413 does not need to comprise a phase modulator. The processing unit 411 is connected to the tunable emitter 100 by signaling line 130, which allows the processing unit 411 to transmit data to the wavelength controller 110 of the tunable emitter 100 (see FIG. 1). Interpretation of this data by the wavelength controller 110 allows the controller 110 to derive the signal that must be sent to the tunable optical subsystem 120 via the signal link line 140 in order to set appropriately the wavelength. The processing unit 411 also communicate with the bit preparation subsystem 413 via a signal link line 415. The tunable emitter 100 is optically connected to the bit preparation subsystem 413 by the optical path 150. After processing and encoding the bit values, the bit preparation subsystem 413 emits the encoded light beam into the quantum channel 430.

The receiver station 420 comprises a receiver processing unit 421 and a bit analysis subsystem 422. In the embodiment illustrated, the processing unit 421 was a computer system having a memory, input/output ports, a central processor managing inputs, memory and operating on such to produce desired outputs, and included data transmission and communications mechanisms permitting communications with other components of the receiver station 420. The receiver processing unit 421 is connected to the public channel 440, which allows it to communicate with the emitter station 411.

The bit analysis subsystem 422 is connected to the quantum channel 430. In the case of a QC apparatus 400 using differential phase shift bit encoding, the bit analysis subsystem comprises: an imbalanced interferometer (not shown) with a path length difference corresponding to the distance between adjacent pulses; and optical detectors (not shown)

with single-photon sensitivity connected to the output port of the imbalanced interferometer. In the case of a QC apparatus 400 using inter-pulse interference for eavesdropper detection, the bit analysis subsystem 422 preferentially comprises a splitter probabilistically (with a certain non-zero probability) sending the light pulses: to an imbalanced interferometer (not shown) with a single-photon sensitivity optical detector connected to at least one of the imbalanced interferometer's outputs; or directly to an optical detector with single-photon sensitivity with a certain non-zero probability. The receiver processing unit 421 is connected to the bit analysis subsystem 422 by signal link line 423, which allows the receiver processing unit 421 to record the outcome of the measurements produced by the bit analysis subsystem 422. The signal link/transmission line 423, as with all such line, can comprise wires or cables appropriate for communicating electronic signals.

The emitter and receiver stations 410 & 420 cooperate by communicating over the conventional channel 440 to produce a secret bit sequence unknowable to the eavesdropper 450, the secret bit sequence derived from the bit sequence transmitted by the emitter 410 and the bit sequence recorded by the receiver 420 after transmission over the quantum channel 430. The tunable emitter 100 is also useful in a "phase coding" quantum cryptography apparatus, as disclosed by Townsend et al. (*Single-photon interference in a* 10 *km long optical fiber interferometer*, Electron. Lett. 29, 634-639 (1993)), but where the imbalanced interferometer of the emitter station is replaced by the present tunable emitter 100, a phase modulator and possibly an amplitude modulator.

In order to allow the wavelength controller 110 to send an appropriate signal to the tunable optical subsystem 120, the emitter processing unit 411 sends on the transmission line 130 a signal based on information obtained collaboratively with the receiver processing unit 421, which allows the wavelength controller 110 to estimate the interference contrast and whether wavelength tuning is required. This information can be extracted from the analysis of the results for example by the emitter processing unit 411 obtained from pulses carrying bit values or alternatively from dummy pulses, which do not carry any bit value and are used exclusively to produce information for wavelength tuning. When pulses carrying bit values are used, wavelength tuning can take place continuously, in which cases all the pulses are used, if possible, to derive information about the accuracy of the wavelength tuning with respect to interference contrast. It is also possible to perform wavelength tuning by analyzing only some of the pulses. When dummy pulses are used, sequences of such pulses are periodically interspersed between sequences of bit carrying pulses to allow gathering information on interference contrast.

Referring now to FIG. 5, the interference contrast adjustment method 500 of the invention includes the following steps:

In a first step 510, the processing unit 411 gathers information on interference contrast derived from one or several detection events received from the processing unit 421.

In a second step 520, the processing unit 411 uses a maximization algorithm to calculate the new value of the wavelength. In a preferred embodiment, this maximization algorithm can for example take the form of a "dither function," where the wavelength is continuously changed back and forth around the value corresponding to the maximum contrast.

In a third step 530, the processing unit 411 transmits information regarding the wavelength adjustment to the wavelength controller 110 on the transmission line 130.

In a fourth step 540, the wavelength controller 110 adjusts the wavelength of the tunable optical subsystem 120 through the signal link line 140.

The QC emitter then loops back to step 510.

Using this method, interference contrast maximization can also be implemented in the wavelength controller 110 rather than in the processing unit 411. In this case, the processing unit 411 sends all the information required by the wavelength controller 110 to run the algorithm.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A tunable Quantum Cryptography (QC) apparatus for maximizing interference contrast in an interferometric quantum cryptography system, the tunable QC apparatus comprising:

an emitter station in electronic communication with a first communications channel and a second communications channel, and at least one of the communications channel being a quantum communications channel, the emitter station including a tunable emitter unit adapted to maximize interference contrast in the QC apparatus by wavelength tuning an emitted light wavelength of an emitter tight source in response to interferometer drift, the tunable emitter unit comprising a laser diode module having a tunable laser diode as the source of emitted light; and a receiver station in operative electronic communications with the emitter station via the first and second communications channels, the combination providing the QC apparatus utilising emitted light wavelength tuning to maximize interference contrast.

2. The tunable QC apparatus of claim 1, wherein the tunable emitter of the emitter stations comprises a wavelength controller and a tunable optical subsystem the tunable optical subsystem adapted to emit light in a range of light wavelengths into the quantum communications channel, the emitted light being a light wavelength emitted in response to a wavelength adjustment signal received by the tunable optical subsystem from the wavelength controller.

3. The tunable QC apparatus of claim 2, wherein the wavelength controller of the tunable emitter comprises a processor selected from the group of processors consisting of: a microprocessor running a program and an electronic circuit; and the wavelength controller having a controller input signal input port via which a signal is received and processed as appropriate by the wavelength controller and the processed signal sent via a controller signal output port to an optical subsystem signal input port of the tunable optical subsystem to adjust the wavelength of the light the optical subsystem emits.

4. The tunable QC apparatus of claim 3, wherein the wavelength controller processes the controlled input signal to determine frequency drift of light emitted by the QU emitter station and provide a processed signal that is a wavelength drift adjustment signal sent via the controller signal output port to the optical subsystem signal input port of the tunable optical subsystem to adjust the wavelength of the light the optical subsystem emits.

5. The tunable QC apparatus of claim 4, wherein the wavelength controller subunit of the tunable emitter unit receives information and is adapted to use the information to generate an appropriate the wavelength drift adjustment signal and to communicate the wavelength adjustment signal to the tunable optical subsystem to change the wavelength of the emitted light.

6. The tunable optical subsystem of claim 5, wherein the light source includes a temperature controller module and a laser diode module, the temperature controller including a thermo-electric cooler and a temperature sensor, and the laser diode module including a laser diode which emits light into a quantum communications channel that is an optical path.

7. The tunable optical subsystem, of claim 5, wherein the light source includes a laser diode module having a laser diode which emits light into the quantum communications channel, the laser diode module receiving a driving current from the adjustable current source, the magnitude of the driving current affecting the laser diode to determine the wavelength of the emitted light, the adjustable current source receiving a wavelength adjustment signal from the wavelength controller to adjust the driving current injected into the laser diode and thus change the light wavelength of the laser diode emits.

8. The tunable QC apparatus of claim 2, wherein the tunable optical subsystem of the tunable emitter further comprises a controller signal input port in communications with the wavelength controller, and at least one other I/O port in communications with other components of the emitter station, the optical subsystem adapted to be tunably responsive to a wavelength drift adjustment signal received from the wavelength controller and adjust the wavelength of the emitted light the optical subsystem.

9. The tunable QC apparatus of claim 6, wherein the tunable optical subsystem includes a light source adapted to receive an adjustment signal and to change the wavelength of the emitted light in response to the adjustment signal.

10. The tunable QC apparatus of claim 9, wherein the tunable optical subsystem of the tunable emitter includes a light source comprising a laser diode module having a tunable mode-locked laser as the source of emitted light, wavelength of the emitted light of the mode-locked laser being adjustable within the range of light wavelengths by adjusting the relative phase between subsequent pulses to provide the QC apparatus utilizing emitted light wavelength tuning to maximize interference contrast.

11. The tunable QC apparatus of claim 10, wherein the tunable mode-locked laser is adapted to be tunable by adjusting the cavity length of the mode-locked laser to adjust the relative, phase between subsequent pulses.

12. The tunable QC apparatus of claim 11, wherein the tunable mode-locked laser is adapted to be tunable by adjusting the cavity length of the mode-locked laser using a piezo-electric element to control the position of at least one of the optical elements of the cavity to adjust the relative phase between subsequent pulses.

13. The tunable QC apparatus of claim 8, wherein the tunable optical subsystem of the tunable emitter includes a tunable light source in operative communication with a temperature regulation unit and a current source.

14. The tunable QC apparatus of claim 13, wherein the current source of the tunable optical subsystem is an adjustable current source, the adjustable current source in signal communication with the wavelength controller and adapted to receive a wave length adjustment signal from the wavelength controller to adjust the driving current injected into the laser diode and correspondingly change the wavelength of the emitted.

15. The tunable QC apparatus of claim 8, wherein the laser diode is a distributed feedback laser diode.

16. The tunable optical subsystem of claim 15, wherein the light source includes a temperature controller module which receives a temperature adjustment signal from the temperature regulation unit and in response to the temperature adjustment signal provides a wavelength adjustment signal to the laser diode module to vary the temperature of the laser diode and change the wavelength of the emitted light.

17. The tunable QC apparatus of claim 1, wherein the emitter station comprises a tunable emitter unit, a hit preparation subsystem and an emitter processing unit in operative communication with the tunable emitter unit and the bit preparation unit.

18. The tunable QC apparatus of claim 17, wherein the tunable, emitter unit of the emitter station comprises a wavelength controller subunit and a tunable optical subsystem, the tunable optical system adapted to emit light within a range of light wavelengths and to selectably vary a wavelength of the light emitted with in the range of light wavelengths in response to a wavelength adjustment signal from the controller subunit.

19. A method for maximizing interference contrast in an interferometric quantum cryptography apparatus using wavelength tuning comprising the steps of:
providing a tunable quantum cryptography apparatus of claim 1;
gathering information on interference contrast by a wavelength controller of an emitter station of the quantum cryptography apparatus;
calculating a new wavelength required for interference contrast optimization by a maximization algorithm; and
transmitting a new wavelength value from the processing unit to a wavelength controller, the wavelength controller then providing a wavelength adjustment signal to a light source of a tunable emitter, to change the wavelength of the emitted light by the emitter station to maximizing the interference contrast in the interferometric quantum cryptography apparatus.

20. A method for maximizing interference contrast in an interferometric quantum cryptography apparatus using wavelength tuning comprising the steps of:
providing a tunable quantum cryptography apparatus of claim 1;
gathering information on interference contrast by a processing unit of an emitter station of the quantum cryptography apparatus;
calculating a new wavelength required for interference contrast optimization by a maximization algorithm; and
transmitting a new wavelength value from the processing unit to a wavelength controller, the wavelength controller then providing a wavelength adjustment signal to a light source of a tunable emitter, to change the wavelength of the emitted light by the emitter station to maximizing the interference contrast in the interferometric quantum cryptography apparatus.

21. A quantum cryptography apparatus comprising:
a wavelength controller; and
a tunable optical subsystem wherein the tunable optical subsystem comprises a tunable laser, the wavelength of which is adjustable to maximize interference contrast and minimize hit error rate.

22. The tunable optical subsystem of claim 21, wherein the tunable laser is a laser diode, the wavelength of which can be tuned.

23. The tunable optical subsystem of claim 22, wherein the wavelength of the tunable laser diode is tuned by temperature adjustment.

24. The tunable optical subsystem of claim 22, wherein the wavelength of the tunable laser diode is tuned by drive current adjustment.

25. The tunable optical subsystem of claim 21, wherein the tunable laser is a DFB laser diode, the wavelength of which can be tuned.

26. The tunable optical subsystem of claim 25, wherein the wavelength of the tunable DFB laser diode is tuned by temperature adjustment.

27. The tunable optical subsystem of claim 25, wherein the wavelength of the tunable DFB laser diode is tuned by drive current adjustment.

28. The quantum cryptography apparatus of claim 21, wherein the tunable optical subsystem comprises a mode locked laser in which an inter pulse phase can be varied.

29. The tunable optical subsystem of claim 28, wherein the mode locked laser comprises a mode locked laser in which the inter pulse phase can be varied by cavity length tuning.

30. The mode locked laser of claim 29, wherein cavity length tuning is accomplished by changing cavity length using a piczo-electric element.

* * * * *

UNITED STATES PATENT AND TRADEMARK OFFICE
CERTIFICATE OF CORRECTION

PATENT NO. : 8,320,774 B2
APPLICATION NO. : 11/774582
DATED : November 27, 2012
INVENTOR(S) : Hugo Zbinden Page 1 of 1

It is certified that error appears in the above-identified patent and that said Letters Patent is hereby corrected as shown below:

In Col. 1, line 17, replace the phrase "method allowing adjust" with --method allowing to adjust--

In Col. 2, line 54, replace the phrase "also know as quantum" with --also known as quantum--

In Col. 5, line 40-41, delete "[Insert a line feed: this paragraph describes the difference of the invention with prior art]"

In Col. 6, line 19, replace "A detailed descriptions" with --Detailed descriptions--

In Col. 6, line 27, replace "In a preferred embodiment" with --in a preferred embodiment--

In Col. 7, line 4, replace "which can made up" with --which can be made up--

In Col. 7, line 58, replace "contrast is not be" with --contrast is not--

In Col. 8, line 6, replace "channel 430 includes" with --channel 430 include--

In Col. 8, line 10, replace "channel 440 includes" with --channel 440 include--

In Col. 8, line 45, replace "to set appropriately" with --to appropriately set--

In Col. 8, line 45, replace "also communicate" with --also communicates--

In Col. 10, line 33, replace "tight source" with --light source--

In Col. 10, line 43, replace "emitter stations" with --emitter station--

In Col. 11, line 4, replace "an appropriate the wavelength" with --an appropriate wavelength--

In Col. 11, line 24, replace "light wavelength of the laser" with --light wavelength the laser--

In Col. 11, line 34, replace "light the optical subsystem" with --light of the optical subsystem--

In Col. 12, line 3, replace "emitted." with --emitted light.--

In Col. 12, line 24, replace "emitted with in the range" with --emitted within the range--

In Col. 12, line 67, replace "minimize hit error rate" with --minimize bit error rate--

Signed and Sealed this
Twenty-ninth Day of January, 2013

David J. Kappos
*Director of the United States Patent and Trademark Office*